United States Patent [19]

Bondoc et al.

[11] Patent Number: 4,472,243

[45] Date of Patent: Sep. 18, 1984

[54] SHEET TYPE ROOFING

[75] Inventors: Alfredo A. Bondoc, South Bound Brook; Eugene J. Flood, Haddonfield; Frederick W. Sieling, Bound Brook, all of N.J.

[73] Assignee: GAF Corporation, Wayne, N.J.

[21] Appl. No.: 595,880

[22] Filed: Apr. 2, 1984

[51] Int. Cl.$^3$ ............................................. D21H 1/10
[52] U.S. Cl. ................................. 162/135; 162/145; 162/149; 162/168.3; 162/169; 162/171; 162/175; 428/141; 428/288; 428/291; 428/297; 428/299; 428/300; 428/301; 428/489; 428/490
[58] Field of Search .............. 162/145, 169, 156, 149, 162/171, 175, 135, 168.3; 428/288, 291, 297, 299, 300, 301, 490, 489, 141

[56] References Cited

U.S. PATENT DOCUMENTS

| | | | |
|---|---|---|---|
| 2,555,401 | 6/1951 | Fasold et al. | 162/171 |
| 2,702,241 | 2/1955 | Hawley | 162/145 |
| 2,772,603 | 12/1956 | Waggoner | 162/145 |
| 3,749,638 | 7/1973 | Renaud et al. | 162/145 |
| 4,035,544 | 7/1977 | Iwasaki et al. | 428/489 |
| 4,225,383 | 9/1980 | McRenolds | 162/156 |
| 4,284,470 | 8/1981 | Bondoc | 162/156 |
| 4,373,992 | 2/1983 | Bondoc | 162/145 |
| 4,440,816 | 4/1984 | Uffner | 428/489 |
| 4,442,172 | 4/1984 | Oshima et al. | 162/156 |

FOREIGN PATENT DOCUMENTS 2009277A 6/1979 United Kingdom .

*Primary Examiner*—Peter Chin
*Attorney, Agent, or Firm*—Joshua J. Ward; Marilyn J. Maue; J. Gary Mohr

[57] ABSTRACT

Sheet type felt material and sheet type roofing material such as shingles and rolls made therefrom. The felt comprises 10-60 wt % glass fibers of varying lengths, 15-80 wt % cellulosic fiber and 5-25% binder. The roofing material is felt of the invention saturated with asphaltic saturant and coated with filled asphaltic coating material and conventional roofing granules.

14 Claims, No Drawings

SHEET TYPE ROOFING

BACKGROUND OF THE INVENTION

The invention relates to sheet type felt suitable for use in manufacture of roofing material and to sheet type roofing material such as shingles made therefrom.

Sheet type roofing materials such as shingles and rolled roofing are normally made from cellulosic felt impregnated and coated with asphalt or from fiberglass mat coated and impregnated with asphalt. Materials based on each of these substrates have certain disadvantages. Conventional sheet roofing materials using cellulosic felt substrates do not provide a desirable degree of fire protection. Roofing materials based on the use of fiberglass mat as substrate can provide the desired degree of fire protection, but tend to have inferior handling characteristics in either hot or cold weather.

SUMMARY OF THE INVENTION

The present invention includes sheet type felt and sheet type roofing material incorporating felt of the invention. Sheet type felt of the invention comprises on a dry basis:
(a) between about 10 and about 50 wt % glass fibers having diameters between about 3 and about 20 microns, said glass fibers comprising between about 50 and about 95 wt % fibers between about 3 and about 7 millimeters in length and between about 5 and about 50 wt % fibers between about 10 and about 15 millimeters in length;
(b) between about 15 and about 80 wt % cellulosic fibers, said cellulosic fibers comprising between about 25 and about 75 wt % short fibers and between about 25 and about 75 wt % long fibers, and
(c) between about 5 and about 25 wt % binder with at least about 0.5 wt % of the binder based on dry felt being hot strength binder.

In preferred embodiments the binder includes styrenebutadiene rubber latex and starch or acrylamide resin.

Sheet type roofing material of the invention comprises felt of the invention which is impregnated with between about 80 and about 150 wt %, preferably between about 105 and about 130 wt %, based on dry felt of asphaltic saturant having a softening point between about 25° and 110° C., preferably between about 70° and about 100° C. In preferred embodiments the saturated felt is coated on both faces with filled asphaltic coating material. Unfilled asphalt used for such products has a softening point between about 90° C. and about 115° C. The asphalt is filled with between about 55 and about 75 wt % based on said coating of mineral stabilizer. For some uses such as in making shingles it is preferred that sheet type roofing material of the invention be further coated on one face with conventional roofing granules.

DETAILED DESCRIPTION OF THE INVENTION

Sheet type felt material of the invention is useful primarily in the manufacture of sheet type roofing products such as products suitable for use in built-up roofing and especially in the manufacture of roofing shingles. Roofing products of the invention possess improved fire resistant and handling characteristics when compared with conventional roofing products based on either felt or glass mat substrates. These improved fire resistant and handling characteristics are achieved by a unique combination of a fibrous felt substrate, asphaltic saturant, asphaltic coating and mineral aggregate granules. The skeletal structure of the fibrous substrate combines with the characteristics of the various other components to produce a desired combination of properties including fire resistant characteristics and mechanical properties such as tear strength, tensile strength, dimensional stability and resistance to bending.

The sheet type fibrous felt of the invention acts as a substrate which forms the skeletal matrix upon which the balanced sheet type roofing materials of the invention are made. The substrate is impregnated with a controlled amount of asphaltic saturant possessing certain softening point characteristics. The resulting saturated substrate may then be used in certain roofing applications such as in producing certain types of built-up roofing or as underlayment. More commonly, however, the saturated substrate is further coated with asphaltic coating possessing certain softening point characteristics and into which certain quantities of mineral filler have been thoroughly mixed. This coating is usually applied to both top and bottom faces of the saturated substrate. Such coated product is useful for instance as rolled roofing material in the production of built-up roofing (BUR). For some applications such as shingle manufacture or manufacture of rolled roofing for certain BUR applications conventional roofing granules are then applied and pressed onto one coated surface which then forms the exposed surface of the roofing product. In preferred embodiments back surfacing is applied to the other surface of the coated substrate to make it non-sticky.

The various components of products of the invention, especially of coated roofing products, interact in a unique manner to attain the desired fire resistant and mechanical properties. The fibrous substrate acts as an asphaltic material sink to restrain coating slide during the "spread of flame" fire resistance test. The substrate also acts as a sheet insulation barrier in the "burning brand" fire test by retaining, even after burning, sheet integrity as formed by the skeletal matrix of the glass fiber content. The asphaltic saturant impregnates the fibrous substrate and fills up its skeletal voids only to a point where the substrate will still act as a sink to restrain asphaltic coating slide during fire testing. However, the level of asphaltic saturant in the substrate should be such that the fiber substrate is essentially completely wetted. Under this condition the saturant retards the burning rate of the substrate thus enhancing the ability of the substrate and the saturant to form an insulating charred material in the burning brand test.

The asphaltic coating applied to saturated felt substrate of the invention should have desired softening point characteristics and mineral filler content. In fire resistance tests the flow characteristics of the filled coating are critical. The mineral filler content of the asphaltic coating should be high enough to develop a high viscosity resistance to flow at elevated temperature, but low enough to make production of roofing products such as shingles practical. The slow flowing coating will char, forming an insulating crusty material that acts as a fire barrier. In addition high filler content reduces the amount of combustible material in the asphalt coating thereby increasing the overall fire resistant characteristics of the product.

As mentioned above, sheet type felt of the invention comprises as essential ingredients cellulosic fiber, glass fiber and binder.

Cellulosic fibers suitable for use in products of the invention include any of the cellulosic fibers commonly used in making materials such as roofing felt and may include for instance fibers derived from wood, paper, rags, etc. For economic reasons waste paper such as waste newspaper, waste kraft corrugated paper, etc. is frequently used. Blends of long and short cellulosic fibers are used in order to obtain felt of desired porosity. In this respect suitable blends contain between about 25 and about 75 wt % short fibers with between about 25 and about 75 wt % long fibers. Cellulosic fibers are used in felt of the invention in amounts between about 15 and about 80 wt % on a dry basis with amounts between about 50 and about 60% on the same basis being preferred. Fibers of the type normally used in making newsprint are for instance a suitable source of short fibers and fibers of the type normally used in making kraft paper are for instance a suitable source of long fibers. Suitable short fibers normally have lengths between about 0.5 and about 1.5 millimeters. Suitable long fibers normally have lengths between about 1.5 and about 3.5 millimeters.

Glass fibers are present in felt of the invention in amounts of between about 10 and about 60 wt % on a dry basis and more preferably in amounts between about 15 and about 35 wt % on the same basis. Chopped glass fiber is especially preferred. Glass fibers used have diameters between about 3 and about 20 microns with fibers having diameters in the general range of about 13-16 microns being especially preferred. Fibers of substantially smaller diameters are sometimes unsatisfactory because of the deleterious effect on felt formation on conventional paper machines and may present health problems. In order to form felt of the desired matrix glass fiber used should comprise between about 50 and about 95 wt % of fibers having lengths between about 3 and about 7 millimeters and about 5–50 wt % of fibers having lengths between about 10 and about 15 millimeters. A convenient mixture of this type includes about 50–95 wt % glass fibers of nominal $\frac{1}{4}$ inch (6.4 mm) length mixed with about 5–40 wt % glass fibers of nominal $\frac{1}{2}$ inch (12.7 mm) length. In general fiber lengths longer than about 7 millimeters create difficulty in felt formation. However, use of a small amount of longer fibers has a pronounced beneficial effect in attaining the desired matrix and fire resistance. It is believed that this is due to the superior bridging mechanism of relatively longer fibers between felt components so that even after burning, sheet integrity without break is maintained.

Glass fiber content of the felt of the invention is important in controlling its porosity and skeletal structure. Low glass fiber content in the felt can result is low porosity and, therefore, low rate of asphalt saturation and a low order of skeletal structure. In this configuration low asphaltic saturant content and low rate of asphaltic saturation can occur which reduces chances of passing the burning brand fire test. The low order of skeletal structure impairs the functioning of the felt as an asphaltic material sink for the asphaltic mineral filled coating in the "spread of flame" fire test and does not provide sufficient bridging action between felt components to maintain felt integrity in the "burning brand" fire test. On the high end of glass fiber content the felt substrate tends to be too porous with a high order of skeletal structure. Such a felt will uncontrollably absorb excessive amounts of asphaltic saturant at a very high rate during roofing shingle processing and this has a deleterious effect in the spread of flame test due to severe asphaltic filled coating slides. Proper proportions and sizes of cellulosic and glass fibers as described herein will provide the desired balance of structural properties in the felt of the invention and rendor such felt suitable as substrate for roofing material of the invention so that such roofing materials can meet the desired standards for mechanical strength and fire resistance.

Binder is used in felt of the invention in amounts between about 5 and about 25 wt % based on dry felt with amounts of between about 7 and about 15 wt % on the same basis being preferred. At least about 0.5 wt % and preferably at least about 7 wt % based on dry felt of the binder used should be hot strength binder. Suitable hot strength binders include for instance acrylamides starch, urea resins, phenol resins, sodium silicates, epoxy resins, etc. Other suitable binders include for instance SBR, acrylic, neoprene, acrylonitrile or other natural or synthetic latices. A preferred binder comprises a mixture of between about 5 and about 15 wt % styrene-butadiene rubber (SBR) latex based on dry felt and between about 0.5 and about 5 wt % based on dry felt of acrylamide resin. Another preferred binder comprises between about 5 and about 15 wt % SBR latex based on dry felt and between about 1 and about 10 wt % starch based on dry felt. A preferred SBR latex is that made by continuous monomer addition without the use of surfactant as taught for instance by U.S. Pat. No. 4,378,272 the disclosure of which is incorporated herein by reference.

In addition to the required ingredients of felt of the invention described above various optional ingredients may be used including for instance flocculants, defoaming agents, precipitants, etc. Suitable flocculants include for instance high molecular weight acrylamide polymer such as Betz 1260 and may be used in amounts of e.g. between about $\frac{1}{2}$ pound and about 8 pounds per ton of dry felt. Suitable precipitants include for instance multivalent metal salts or synthetic polymers.

Felt of the invention may be manufactured in a conventional manner on conventional equipment such as single cylinder or Fourdinier machines. Felt thickness may vary widely depending upon the desired end use application with thicknesses between about 0.4 and 4.0 millimeters being suitable for many applications including roll roofing and shingles. In order to provide the desired matrix for preferred end uses a dry felt apparent density between about 15 and about 35 lb/ft$^3$ (0.24-0.56 g/cc) is preferred.

As mentioned above, felt of the invention may be saturated with asphaltic saturant to obtain sheet type roofing material of the invention. Depending upon the desired end use, the saturated felt may further be coated with filled asphaltic coating material and the coated felt may be further coated on one side with conventional roofing granules. In order to obtain the desired combination of good mechanical properties and adequate fire resistance, the special matrix present in felt of the invention must be filled with the proper amount of the proper type of asphaltic saturant and for coated product the proper type of asphaltic coating must then be used.

Asphaltic saturant and coating materials suitable for use in producing roofing materials of the invention may be derived from petroleum, coal or other sources with saturants and coating materials derived from petroleum distillation being preferred. Generally the asphaltic saturant and coating materials have similar chemical components. They do, however, differ in physical characteristics. Asphaltic saturant for use in producing product of the invention should have a softening point as measured by ASTM D-36-76 of between about 25° and about 110° C., more preferably between about 70° and about 100° C. Suitable asphaltic coating materials have softening points as measured on the same basis between about 90° and about 115° C. Asphaltic coating material should contain between about 50 and about 75 wt %, preferably between about 60 and about 70 wt %, mineral stabilizer as determined by UL 55B mineral stabilizer test (Oct. 30, 1974). The mineral stabilizer should be of the type commonly used in filled asphaltic coatings and may be derived from limestone, stone dust, sand and other sources of suitable fine mineral aggregate.

In forming roofing materials of the invention the felt of the invention is impregnated with asphaltic saturant to a saturation level of between about 80 and about 150%, preferably between about 100 and about 130% (% saturation is expressed in weight % by dividing weight of saturant by weight of dry felt). When asphaltic coating material is used it is applied to both faces of the saturated felt. Top coating on what is to be the upper surface of end roofing product usually applies between about 20 and about 45 pounds, more preferably between about 25 and about 35 pounds, of coating per 100 square feet of surface area of the saturated felt while back coating usually applies between about 3 and about 10 pounds per hundred square feet. When desired such as for making shingles or certain types of rolled roofing material, conventional roofing granules are then applied and pressed into the top coated surface for decorative and protective purposes. Granules commonly used in roofing manufacture are referred to as No. 11 granules and No. 9 granules. No. 11 granules are normally used in amounts between about 25 and about 45 pounds per 100 square feet; and No. 9 granules are normally used in amounts between about 60 and about 80 pounds per 100 square feet. A fine mineral aggregate such as sand is preferably applied to the back coated surface in a conventional manner to prevent blocking and sticking.

As mentioned, felt of the invention may be prepared using conventional paper making equipment. In preparing the felt, a blend of cellulosic fibers is dispersed in a water slurry in suitable equipment such as a hydrapulper. When the fibers are fully dispersed, chopped glass fibers are added and thoroughly dispersed in the slurry of cellulosic fibers. Binder as called for by the invention is then added and the slurry is mixed thoroughly. Binder particles are then precipitated in the slurry using aluminum sulphate. Stock consistency is adjusted as desired and the completed stock is decanted to the forming end of a conventional paper making machine at which point flocculant is usually added and mixed thoroughly with the slurry prior to forming the felt product. Subsequent processing usually includes pressing for water removal, followed by drying and winding into rolls. A defoaming agent may also be used.

The following examples are intended to illustrate the invention without limiting the scope thereof.

EXAMPLE 1

In order to demonstrate the favorable fire resistance of products made with felt of the invention, products were made and tested as described immediately below.

Felt used in this example was made on conventional paper making equipment and was identical for all runs except for the varying amounts of glass, cellulose and binder and the varying types of binder used as set forth in Table I below. The shingles and rolled roofing product referred to in this example were made using conventional roofing plant equipment.

The "burning brand" and "spread of flame" tests reported herein were conducted in accordance with ASTM E-108 using simulated roof decks prepared as specified in ASTM E-108 except that the "spread of flame" differed from that described in ASTM E-108 in that a simulated roof deck measuring 40"×48" was used rather than the 40"×13' deck specified by ASTM E-108. Natural gas was supplied to a slotted burner measuring ¼" by 18" at the base of the deck at approximately 6 inches of water pressure while a 12 mile per hour wind was blowing across the deck. All decks tested were mounted at approximately a 30° angle to the horizontal.

Conventional organic based shingles will normally fail a Class A "burning brand" test at about 14 minutes and in the "spread of flame" test will normally show a spread of greater than 48" after 4 or 5 minutes. Conventional glass mat based shingles commonly pass the Class A "burning brand" test at 45 to 120 minutes and commonly give maximum flame spreads in the "spread of flame" test between 25 and 35 inches at 8 to 9 minutes of testing. Roll roofing made using either organic felt or glass mat will not pass Class A or B "burning brand" tests but is expected to pass Class C "burning brand" tests. Roofing products using felt of the invention provide results which are generally comparable with those obtained using conventional glass mat based materials but without the mechanical disadvantages associated with the glass mat based materials.

Filled coating used in this example was filled with 52–63 wt % mineral filler and was based upon unfilled coating having a softening point of 222–225° F. Asphalt saturant used had a softening point of 162° F. except for the saturant used in Run 1 which had a softening point of 147° F. and that used in runs 5 and 6 which had a softening point of 138° F.

Table I shows ingredients used and results obtained in "burning brand" and "spread of flame" tests for a number of different compositions of felt as well as shingle and rolled roofing product made from such felt in accordance with the invention. The results of "burning brand" and "spread of flame" tests on the felt and rolled roofing products are also set forth in Table I.

TABLE I

|  | Run No. | | | | | |
| --- | --- | --- | --- | --- | --- | --- |
|  | 1 | 2 | 3 | 4 | 5 | 6 |
| Ingredients (as wt. %) | | | | | | |
| chopped glass (70% ¼", 30% ½") | 35 | 27 | 25 | — | — | — |
| chopped glass (100% ¼" 30% ½") | — | — | — | — | 15 | 15 |
| cellulose (50% news print, 50% kraft) | 53 | 61 | 61 | 63 | 76 | 73 |
| Binder | | | | | | |

TABLE I-continued

|  | Run No. | | | | | |
| --- | --- | --- | --- | --- | --- | --- |
|  | 1 | 2 | 3 | 4 | 5 | 6 |
| a. 100% SBR | 12 | — | — | — | 7 | 7 |
| b. 83% SBR, 17% acrylamide | — | 12 | — | — | 9 | — |
| c. 58% SBR, 42% starch | — | — | — | 12 | — | 12 |
| d. 74% SBR, 26% starch | — | — | 9.5 | — | — | — |
| Felt Converted to: | Shingles | | | | Rolls | |
| Product Composition (lbs/100 sq. ft.) | | | | | | |
| Felt | 4.8 | 4.7 | 4.3 | 5.3 | 5.3 | 4.7 |
| Asphalt Saturant | 7.0 | 4.8 | 5.4 | 4.3 | 7.3 | 5.1 |
| Filled Coating Face | 27.0 | 29.0 | 31.2 | 33.4 | 14.7 | 17.4 |
| Back | 9.0 | 8.7 | 6.4 | 9.2 | 8.5 | 8.2 |
| Granules (No. 11) Face | 38.2 | 36.8 | 38.0 | 40.7 | 29.2 | 31.0 |
| Sand - Back | 5.6 | 4.1 | 4.2 | 4.3 | 3.2 | 2.7 |
| Wt % Filler in Coating | 60 | 61 | 63 | 62 | 54 | 52 |
| Test Results | | | | | | |
| Fire Test. Burning Brand (Mins) | 60 | 55 | 75 | 45 | — | — |
| Pass/Fail | Pass | Fail | Pass | Pass | Pass | Pass |
| Spread of Flame maximum spread (in) | 36 | 26 | 27 | 25 | 32 | 33 |
| at (min) | 7 | 5.5 | 6 | 6 | 6 | 6.5 |

EXAMPLE 2

In order to illustrate the desirability of using both long and short glass fibers in felt of the invention, felt handsheets were made and tested in the laboratory as described immediately below. Ingredients used and test results were as shown in Table II.

In making felt for this experiment the cellulosic fibers were blended and thoroughly dispersed in water. The glass fibers were then added and thoroughly dispersed. The latex binder was then mixed with the resulting slurry and subsequently precipitated with alum solution. The acrylamide resin binder and a flocculant were then added and the consistency adjusted as desired. Handsheets were then formed using a Williams mold. The formed sheets were then dried and tested for tensile strength and Elmendorf Tear with the results shown in Table II.

TABLE II

|  | Handsheet No. | |
| --- | --- | --- |
|  | 1 | 2 |
| Ingredients (wt % dry basis) | | |
| Waste Newsprint | 26.75 | 26.75 |
| Waste Kraft Corrugated Paper | 26.75 | 26.75 |
| Glass Fibers - ¼" M Filament | 35.00 | 30.00 |
| Glass Fibers - ½" M Filament | — | 5.00 |
| SBR Latex | 10.00 | 10.00 |
| Acrylamide Resin | 1.50 | 1.50 |
| Physical Characteristics | | |
| Tensile Strength (lb/in) | 36 | 40 |
| Elmendorf Tear (grams) | 352 | 432 |

EXAMPLE 3

To illustrate the desirability of using both long and short cellulosic fibers in felt of the invention for controlling porosity of the felt while maintaining optimum tensile and tear strength, felt handsheets were made as described in Example 2 using the ingredients shown in Table III and were tested with the results shown in Table III.

TABLE III

|  | Handsheet No. | | |
| --- | --- | --- | --- |
|  | 3 | 4 | 5 |
| Ingredients (wt % dry basis) | | | |
| Waste Newsprint | 29.25 | — | 58.50 |
| Waste Kraft Corrugated Paper | 29.25 | 58.50 | — |
| Glass Fibers - ¼" K Filament | 30.00 | 30.00 | 30.00 |
| SBR Latex | 9.60 | 9.60 | 9.60 |
| Acrylamide Resin | 1.90 | 1.90 | 1.90 |
| Physical Characteristics | | | |
| Tensile Strength (lb/in) | 36 | 50 | 25 |
| Elmendorf Tear (gram) | 424 | 680 | 328 |
| % Kerosene Absorption | 157 | 176 | 148 |

While the invention has been described above with respect to preferred embodiments thereof, it will be understood by those skilled in the art that various changes and modifications may be made without departing from the spirit or scope of the invention.

What is claimed is:

1. Sheet type felt comprising on a dry basis:
   (a) between about 10 and about 60 wt % glass fiber having diameters between about 3 and about 20 microns, said glass fibers comprising between about 50 and about 95% fibers between about 3 and about 7 millimeters in length and between about 5 and about 50% fibers between about 10 and about 15 millimeters in length;
   (b) between about 15 and about 80 wt % cellulosic fibers, said cellulosic fibers comprising between about 25 and about 75 wt % short fibers between about 0.5 and about 1.5 millimeters and between about 25 and about 75 wt % long fibers between about 1.5 and about 3.5 millimeters in length; and
   (c) between about 5 and about 25 wt % binder with at least about 0.5 wt % of the binder based on dry felt being hot strength binder.

2. Felt according to claim 1 comprising on a dry basis between about 15 and about 35 wt % glass fibers and between about 50 and about 60 wt % cellulosic fibers.

3. Felt according to claim 2 wherein the binder comprises between about 5 and about 15 wt % based on dry felt of styrene-butadiene rubber latex and between about 1 and about 10 wt % starch on the same basis.

4. Felt according to claim 2 wherein the binder comprises between about 5 and about 15 wt % based on dry felt of styrene-butadiene rubber latex and between about 0.5 and about 5 wt % acrylamide resin on the same basis.

5. Sheet type roofing material comprising sheet rype felt according to claim 1 said felt being saturated with between about 80 and about 150 wt % based on dry felt of asphaltic saturant having a softening point between about 25° and about 110° C.

6. Roofing material according to claim 5 comprising between about 15 and about 35 wt % glass fibers based on dry felt and between about 50 and about 60 wt % cellulosic fibers on the same basis and wherein the felt is saturated with between about 100 and about 130 wt % based on dry felt of asphaltic saturant having a softening point between about 70 and about 100° C.

7. Roofing material according to claim 5 which is top coated with between about 25 and about 45 pounds per hundred square feet and back coated with between about 3 and about 10 pounds per hundred square feet of asphaltic coating material, said coating material having a softening point between about 90 and about 115° C. and containing between about 50 and about 75 wt % mineral stabilizer.

8. Roofing material according claim 5 wherein the saturated felt is top coated with between about 25 and about 45 pounds per hundred square feet and back coated with between about 3 and about 10 pounds per hundred square feet of asphaltic coating material having a softening point between about 90° and about 110° C. and being filled with between about 50 and about 75 wt % mineral stabilizer and wherein the thus top coated material is further coated on the top coated side with between about 25 and about 80 pounds per hundred square feet of roofing granules.

9. Roofing material according to claim 8 in which
(a) glass fibers are present in the felt in amounts between about 15 and about 35 wt % based on dry felt;
(b) cellulosic fibers are present in the felt in amounts between about 50 and about 60 wt % based on dry felt;
(c) the felt is saturated with between about 100 and about 130 wt % based on dry felt of asphaltic saturant having a softening point between about 70 and about 100° C.; and
(d) the saturated felt is top coated with between about 25 and about 35 pounds per hundred square feet of asphaltic coating filled with between about 60 and about 70 wt % mineral stabilizer and having a softening point between about 90° and about 115° C. and is back coated with between about 3 and about 10 pounds per hundred square foot of such coating.

10. Roofing material according to claim 7 wherein the binder comprises between about 5 and about 15 wt % based on dry felt of styrene-butadiene rubber latex and between about 1 and about 10 wt % on the same basis of starch.

11. Roofing material according to claim 7 wherein the binder comprises between about 5 and about 15 wt % based on dry felt of styrene-butadiene rubber latex and between about 0.5 and about 5 wt % on the same basis of acrylamide resin.

12. Roofing material according to claim 9 wherein the binder comprises between about 5 and about 15 wt % based on dry felt of styrene butadiene rubber latex and between about 1 and about 10 wt % on the same basis of starch.

13. Roofing material according to claim 9 wherein the binder comprises between about 5 and about 15 wt % based on dry felt of styrene butadiene rubber latex and between about 0.5 and about 5 wt % on the same basis of acrylamide resin.

14. Roofing material according to claim 9 in the form of shingles.

* * * * *